(12) United States Patent
Shuttleworth

(10) Patent No.: US 6,913,420 B2
(45) Date of Patent: Jul. 5, 2005

(54) FLUID MOVEMENT APPARATUS

(75) Inventor: Andrew Bryan Shuttleworth, Poulton-le-Fylde (GB)

(73) Assignee: Permavoid Limited, Leicester (GB)

( * ) Notice: Subject to any disclaimer, the term of this patent is extended or adjusted under 35 U.S.C. 154(b) by 0 days.

(21) Appl. No.: 10/363,754

(22) PCT Filed: Sep. 7, 2001

(86) PCT No.: PCT/GB01/04018

§ 371 (c)(1),
(2), (4) Date: Jul. 28, 2003

(87) PCT Pub. No.: WO02/20186

PCT Pub. Date: Mar. 14, 2002

(65) Prior Publication Data

US 2004/0028475 A1 Feb. 12, 2004

(30) Foreign Application Priority Data

Sep. 8, 2000 (GB) .............................................. 0022029

(51) Int. Cl.⁷ ................................................ B09G 1/00
(52) U.S. Cl. ............................... 405/128.3; 405/128.2; 405/129.57
(58) Field of Search .......................... 405/128.1, 128.2, 405/128.25, 128.3, 129.57

(56) References Cited

U.S. PATENT DOCUMENTS

| 3,941,556 | A | * | 3/1976 | Pallagi | ....................... 431/202 |
| 4,293,237 | A | | 10/1981 | Robey et al. | |
| 4,745,850 | A | * | 5/1988 | Bastian et al. | .......... 405/128.15 |
| 4,832,122 | A | * | 5/1989 | Corey et al. | ........... 405/128.25 |
| 5,178,491 | A | * | 1/1993 | Graves et al. | ............ 405/128.3 |
| 5,183,355 | A | * | 2/1993 | Treat et al. | ............. 405/129.85 |
| 5,277,518 | A | * | 1/1994 | Billings et al. | ........... 405/128.3 |
| 5,421,672 | A | * | 6/1995 | Ankeny et al. | ......... 405/129.45 |
| 5,740,638 | A | | 4/1998 | Shepherd, III | |
| 5,893,680 | A | | 4/1999 | Lowry et al. | |

FOREIGN PATENT DOCUMENTS

| DE | 3528317 A | * | 2/1987 | ............. B09B/1/00 |
| DE | 19518998 A | * | 12/1996 | |
| EP | 0 505 218 | | 9/1992 | |
| FR | 2623736 A | * | 6/1989 | ............. B09B/5/00 |
| GB | 780212 A | * | 7/1957 | |
| GB | 1030619 A | * | 5/1966 | |
| GB | 2 263 853 | | 8/1993 | |
| WO | WO9947756 A | * | 9/1999 | |

* cited by examiner

*Primary Examiner*—John Kreck
(74) *Attorney, Agent, or Firm*—Smith-Hill and Bedell

(57) ABSTRACT

Apparatus suitable for venting and dispensing gas from an area of ground. The apparatus comprising a passage arrangement locatable in the ground extending generally horizontally and formed from a plurality of self-supporting open units. One or more columns extends downwardly from the passage, the columns being formed of a core material having an open permeable structure. The or each column has a fluid permeable exterior, and is in communication with the passage.

19 Claims, 4 Drawing Sheets

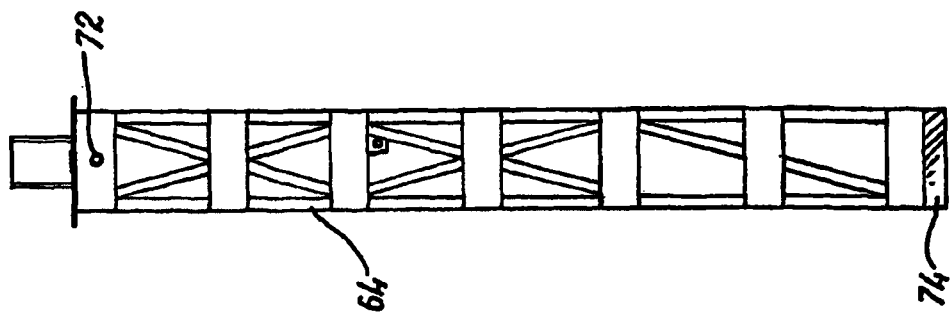
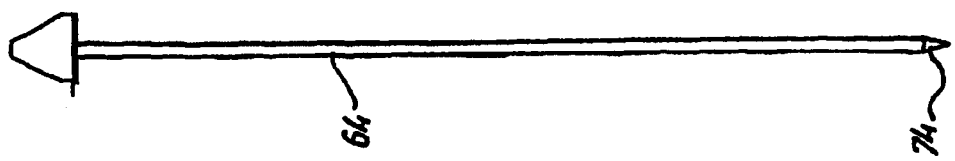
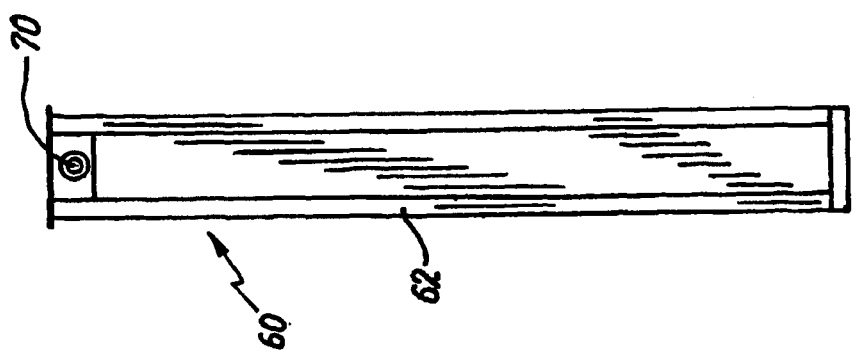
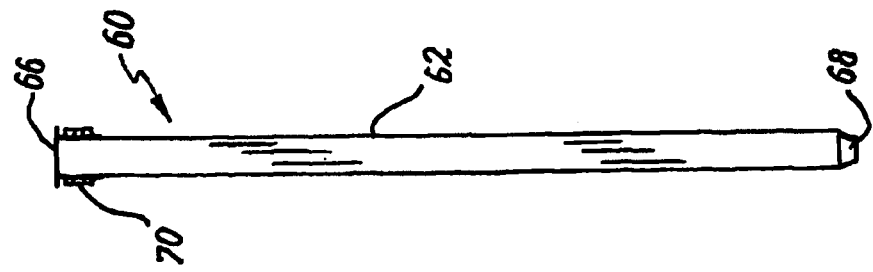

FLUID MOVEMENT APPARATUS

This is a national stage application filed under 35 USC 371 based on International Application No. PCT/GB2001/04018 filed Sep. 7, 2001, and claims priority under 35 USC 119 of United Kingdom Patent Application No. 0022029.3 filed Sep. 8, 2000.

This invention concerns fluid movement apparatus, and also apparatus for dispersing a gas or liquid from an area of ground, and also a method of dispersing gas or liquid from an area of ground.

Significant problems can be encountered with hazardous liquids and gases located in the ground. One of these problems is lateral migration of the hazardous fluid. Conventionally this has been prevented using impermeable barriers which may be in the form of a membrane, or an impervious material such as a clay, e.g. bentonite. This solution though provides an additional problem in that it tends to concentrate the hazardous fluid against the barrier. Such areas of ground are often vented to provide for natural venting of the hazardous fluids, but the rates of venting can be relatively low.

Problems can also be encountered in drainage of rain water, and particularly where the surface drainage capacity has already been used up. This can prevent the development of otherwise suitable locations.

According to the present invention there is provided apparatus for moving fluids in the ground, the apparatus comprising a passage arrangement locatable in the ground extending generally horizontally, and one or more column arrangements through which fluid can pass, the or each column arrangement being locatable in the ground extending downwardly from the passage arrangement and in communication therewith, with at least part of the or each column arrangement having a fluid permeable exterior.

The passage arrangement and/or the column arrangement may comprise a self supporting open structure. The open structure may be formed of a plastics material, which may comprise polypropylene. The open structure may comprise a plurality of interconnectable modular units.

The open structure may have an impermeable exterior. Alternatively, the open structure may be provided within a coating layer. The coating layer may at least in part be permeable to enable fluid to pass therethrough. The coating layer may have a relatively small pore size to act as a filter and substantially prevent solid material above a particular size passing therethrough.

The coating layer may comprise a textile material. The textile material may be non-woven and may comprise a felt. The textile material may be made of plastics material and may be made of polypropylene.

Means may be provided for drawing fluid through the column arrangement. The fluid drawing means may include means for creating a below ambient pressure in the passage arrangement such that fluid is drawn thereinto from the column arrangement. The below ambient pressure creating means may comprise means for creating a flow of fluid, and desirably air, through the passage arrangement.

The air flow creating means may comprise an outlet extendible from the passage arrangement to atmosphere, and desirably also an inlet. The outlet may be of greater cross sectional size than the inlet. The outlet and/or inlet may be wind drivable.

The invention also provides apparatus for dispersing gas from an area of ground, the apparatus being according to any of the preceding six paragraphs.

The passage arrangement preferably at least partially surrounds the area of ground. The passage arrangement preferably has a substantially impermeable exterior.

A plurality of column arrangements are preferably provided extending from the passage arrangement at spaced intervals.

The invention further provides a method of dispersing gas from an area of ground, the method comprising using apparatus according to any of the preceding three paragraphs.

The invention yet further provides a method of substantially preventing lateral gas migration from an area of ground, the method comprising using apparatus according to any of said preceding three paragraphs.

The invention still further provides apparatus for draining an area of ground, the apparatus comprising a column arrangement through which fluid can pass, the column arrangement being locatable extending downwardly through the ground, at least part of the column arrangement having a fluid permeable exterior.

A fluid collecting unit may be in communication with an upper part of the column arrangement to direct fluid thereinto, the collecting unit may be in the form of an open self-supporting structure located in the ground, which may extend to form a generally horizontal passage arrangement from which one or more column arrangements extend.

A part of the exterior of the or each column arrangement may be substantially impermeable to prevent fluid passing thereoutof or thereinto from a particular layer in the ground.

The lower end of the or each column arrangement may extend into fluid receiving means from which collected fluid can be removed, for instance by pumping.

The invention yet further provides apparatus for dispersing liquid from an area of ground, the apparatus being according to any of the preceding four paragraphs.

The invention yet further provides a method of dispersing liquid from an area of ground, the method comprising using apparatus according to any of said preceding four paragraphs.

The invention also provides apparatus for forming a column arrangement in the ground, the apparatus comprising a drivable member selectively mountable in an elongate sleeve member such that a part of the drivable member extends below the sleeve member so that the drivable member and sleeve member when mounted together can be driven into the ground, the drivable member can subsequently be dismounted from the sleeve member and removed, and the sleeve member can thereafter be removed from the ground.

A driving formation is preferably provided on the lower end of the drivable member which formation extends beyond the sleeve member when the latter is mounted thereto. The driving formation may have a chisel shaped profile. Corresponding mounting formations may be provided on the drivable member and the sleeve member which permit said members to be driven together into the ground.

The invention moreover provides a method of forming a column arrangement in the ground, the method comprising using apparatus according to either of the preceding paragraphs, and locating the material of the arrangement within the sleeve member following removal of the drivable member therefrom, and subsequently removing the sleeve member from the ground.

The combination of drivable member and sleeve member are preferably driven into the ground by vibratory piling. The sleeve member may be removed from the ground by a vibratory action.

Embodiments of the present invention will now be described by way of example only and with reference to the accompanying drawings, in which:

FIGS. 4 and 5 are respectively end and side views of a first component of a first apparatus suitable for producing the apparatus of FIGS. 1–3;

FIGS. 6 and 7 are similar views respectively to FIGS. 4 and 5 of a second component of the first apparatus;

Figure 1:
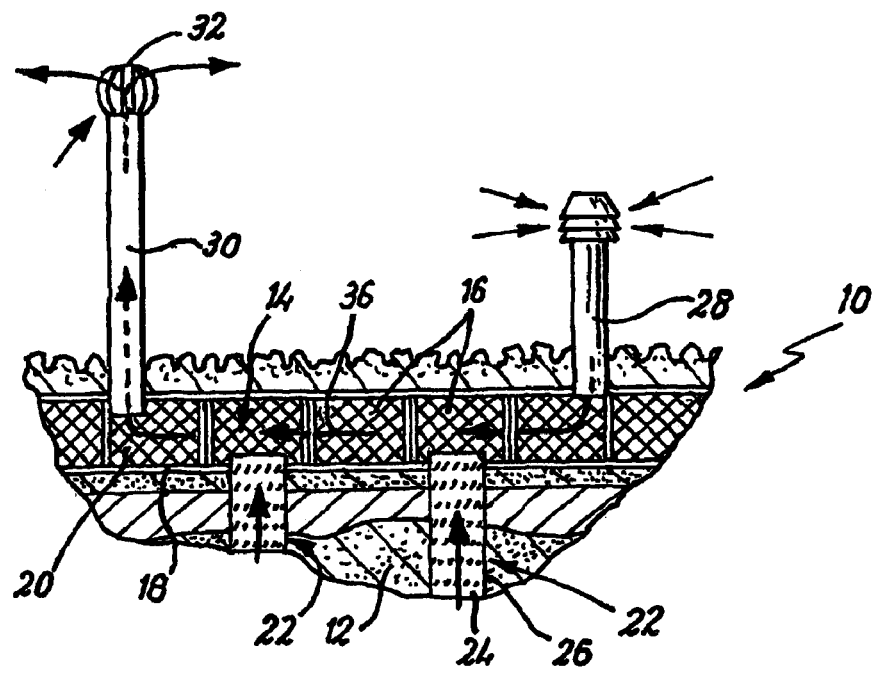
FIG. 1 is a diagrammatic cross sectional view through a first apparatus according to the invention in use.
Figure 2:
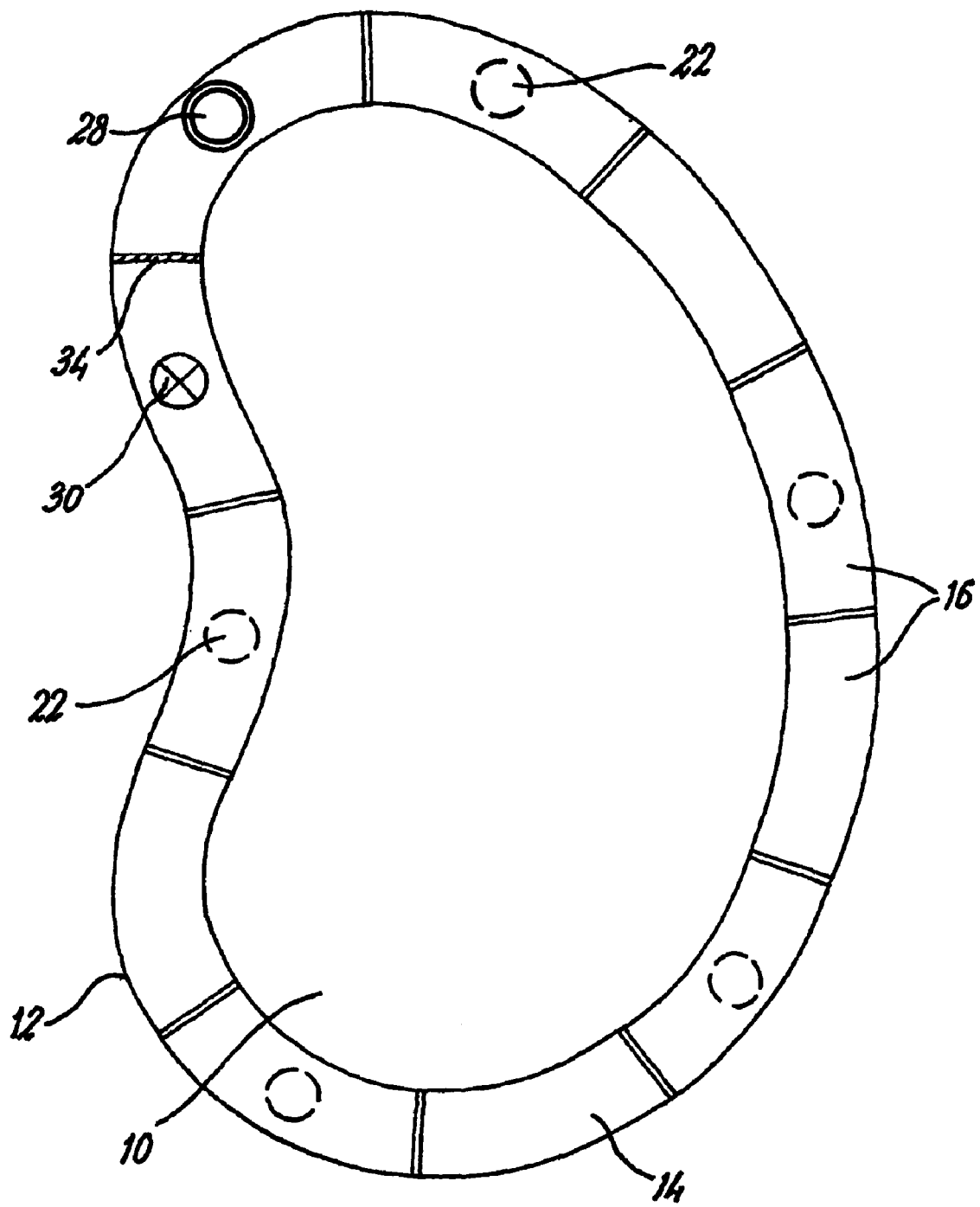
FIG. 2 is a diagrammatic plan view of the apparatus of FIG. 1 in use.

FIGS. 1 and 2 show apparatus 10 suitable for venting and dispensing gas from an area of ground 12, and substantially preventing lateral dispersion of gas therefrom. The ground 12 could typically be part of a landfill site, and the apparatus is suitable for dealing with hazardous ground borne gases such as methane, carbon dioxide, hydrogen sulphide, carbon monoxide or radon.

The apparatus 10 comprises a lateral duct 14 which extends in a loop as shown in FIG. 2, though the duct can be formed to any shape as is required by particular circumstances. The duct 14 is located just below the surface of the ground 12 and is formed from a number of modular units 16. Each unit 16 is formed from polypropylene and comprises an outer impermeable skin 18 with an open structure 20 therein providing the unit 16 with high permeability. A plurality of spaced columns 22 extend downwardly from alternate ones of the units 16. The columns 22 can extend for instance for depths of a few meters and are permeable such that gas in surrounding ground can be drawn thereinto. The columns 22 are formed from a core material 24 also of propylene and having an open permeable structure. The core material 24 is located within a permeable material 26 which in this instance is a polypropylene felt. The material 26 acts as a filter to prevent all but very fine solid material entering thereinto.

A vent bollard 28 extends from a one of the units 16 and is in communication with the interior thereof. A wind drivable vent stack 30 with an aspiromatic cowl 32 is provided extending from another of the units 16. In FIG. 2 the bollard 28 and stack 30 are shown located on adjacent units 16 with an impermeable barrier 34 provided between the adjacent units 16.

In use the stack 30 would be wind driven to create an air flow through the duct 14 as shown by the arrows 36, which would be in a clockwork direction as shown in FIG. 2. This causes below ambient pressure in the duct 14 which causes gas to be pulled through the columns 22 and hence causes gas from the ground 12 to be dispersed into the duct 14 and out through the cowl 32 into the atmosphere. The gas from the ground 12 is diluted with air entering through the bollard 28 thereby reducing the danger of a build-up of hazardous material exiting the ground. With required spacing of the columns 22, the columns 22 combine to act on the surrounding ground to provide a virtual curtain around the ground 12 thereby substantially preventing transverse migration of gas outwardly from the ground 12.

There is thus described an apparatus and system for dispersal and simultaneous diluting of gas whilst substantially prevent lateral migration. The apparatus has been found to operate very efficiently whilst being of relatively simple and maintenance free construction.

Figure 3:
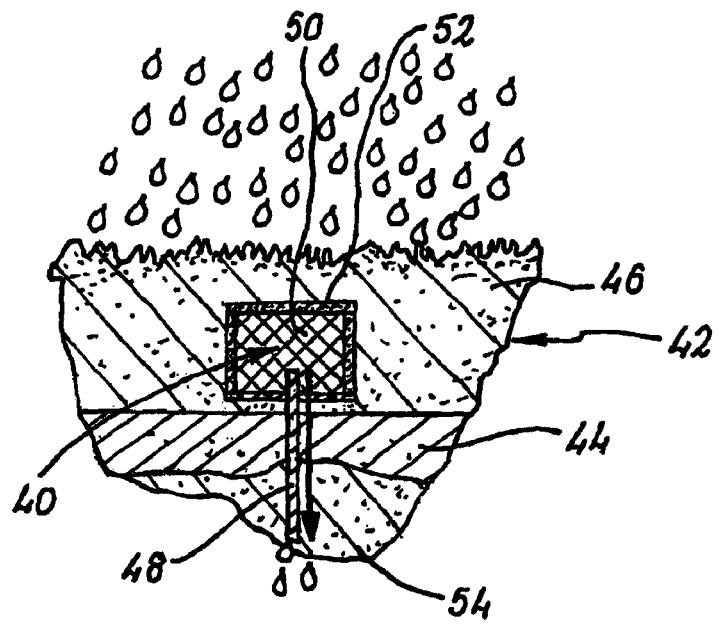
FIG. 3 is a similar view to FIG. 1 of a second apparatus in use.

FIG. 3 shows apparatus 40 suitable for draining ground 42 which may for instance have an impermeable layer 44 such as a layer of clay below the top soil 46. The apparatus 40 comprises a number of columns 48 (only one of which is shown) which are similar to the columns 22. A collection unit 50 is provided above the columns 48 and could extend in a loop or any required pattern. The unit 50 has a similar form to the units 16 of the apparatus 10 except that an outer permeable skin 52 is provided. The skin 52 has sufficiently small pore size to substantially only permit water to pass therethrough.

Water entering the ground 42 will tend to enter the unit 50 and pass through the columns 48 down through the impermeable Layer 44. The water could pass into a permeable layer 54 which may for instance be an aquifer. Alternatively, the water could pass through to a drain or collecting area where it may be transferred perhaps by pumping for disposal or subsequent use for example in flushing toilets and the like.

Similar arrangements could be used for dispersing hazardous liquids such as leachate from a landfill site. In such instances the collected liquid would usually be removed and probably by pumping for disposal elsewhere or recirculation.

There is again described a system of relatively simple and maintenance free construction but which provides drainage and/or liquid dispersal in situations where other techniques would not be applicable.

FIGS. 4 to 7 show apparatus 60 according to the invention suitable for use in producing the columns 22, 48. The apparatus 60 comprises a sleeve 62 and drivable mandrel 64. The sleeve 62 is of rectangular cross section with open upper and lower ends 66, 68. A mounting hole 70 is provided through the sleeve 62 adjacent the upper end 66.

The mandrel 64 is slidably locatable in the sleeve 60 and has an alignable mounting hole 72. A chisel shape driving member 74 is provided at the lower end of the mandrel 64 which extends beyond the sleeve 62 when the mandrel 64 is located therein. The mandrel 64 has a framework construction.

In use to form a column, the mandrel 64 is located in the sleeve 62 and mounted thereto using the holes 70, 72. The aligned sleeve and mandrel 62, 64 are vibro-driven into the ground. The mandrel 64 is then disconnected from the sleeve 62 and slid thereoutof. The material of the column can then be slid into the sleeve 62. Once this has been completed the sleeve 62 is removed using a vibratory action to leave the filled column.

Figure 8:
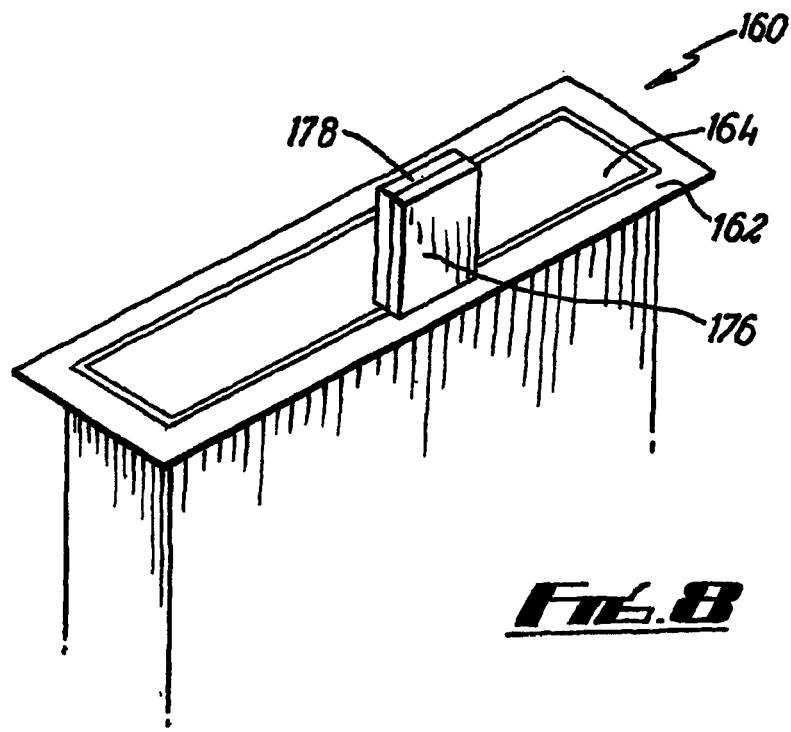
FIG. 8 is a diagrammatic perspective view of parts of a second such apparatus.
Figure 9:
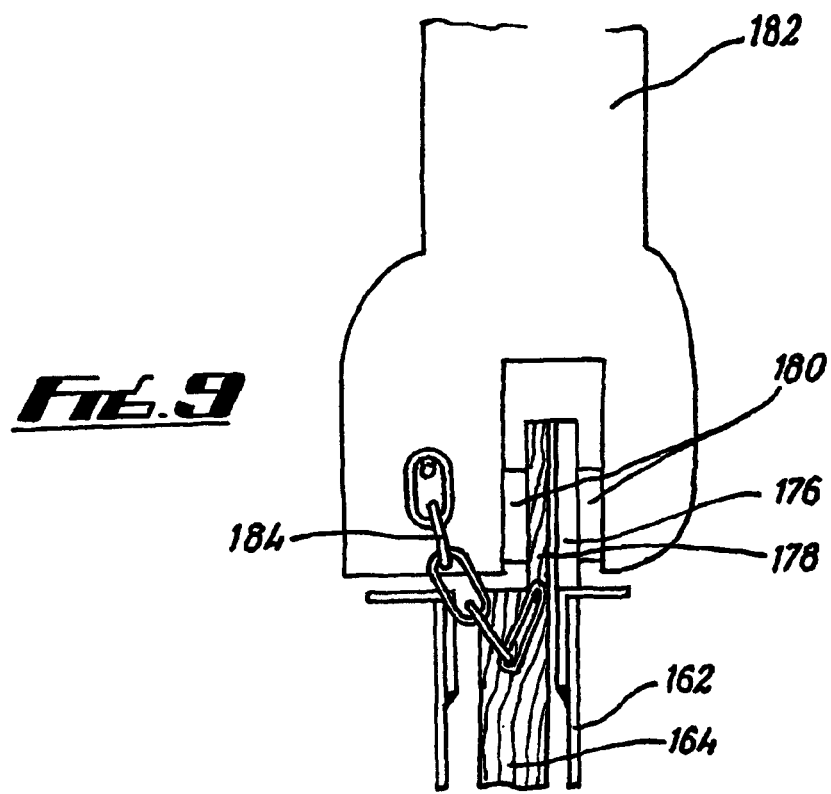
FIG. 9 is a diagrammatic sectional view through part of the second apparatus in use.

FIGS. 8 and 9 show part of similar alternative apparatus 160 for use in producing the columns 22,48. Rather than providing mounting holes, correspondingly shaped and dimensioned tabs 176 and 178 are provided respectively on the upper ends of the sleeve 162 and mandrel 164.

In use as shown in FIG. 9, the tabs 176 and 178 abut against each other and are damped together by a clamping part 180 of a vibratory hammer 182, to provide simultaneous piling of the sleeve 162 and mandrel 164. A chain 184 is provided selectively extendible between the hammer 182 and the mandrel 164 to permit removal of the mandrel 164 from the sleeve 162 following piling. The sleeve 162 can subsequently be removed from the ground using the clamping part 180 in engagement with the tab 176.

This arrangement means the sleeve 162 and mandrel 164 are driven as a single unit which tends to reduce wear. Also, the arrangement can be set up quickly without the need of the fitting of pins and the like.

Various other modifications may be made other than those outlined above. For instance, different apparatus could be used for forming the columns, though the above described apparatus are found to be particularly suitable. When dispersing gas or fluid from an area of ground, in addition to providing a ring of columns therearound, it may be necessary to provide one or more spokes of aligned columns.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. Apparatus for dispersing a gas from an area of ground, the apparatus comprising a passage arrangement locatable in the ground extending generally horizontally to at least partially surround the area of ground, the passage arrangement having a substantially impermeable exterior, one or more column arrangenments through which fluid can pass, the or each column arrangement being locatable in the ground extending downwardly from the passage arrangement and in communication therewith, with at least part of the or each column arrangement having a fluid permeable exterior to receive gas from the area of ground, means for creating a below ambient pressure in the passage arrangement such that gas is drawn thereinto from the column arrangement or arrangements, the below ambient pressure creating means comprising means for creating a flow of air through the passage arrangement, an inlet, and an outlet extendible from the passage arrangement to atmosphere.

2. Apparatus according to claim 1, in which the outlet is of greater cross sectional size than the inlet.

3. Apparatus according to claim 1, in which the outlet and/or inlet is wind driveable.

4. A method of preparing an area of ground to facilitate dispersal of gas from the ground comprising:

installing a passage arrangement in the ground and extending generally horizontally to at least partially surround the area of ground, the passage arrangement having a substantially impermeable exterior, an inlet, and an outlet extending to atmosphere, providing one or more column arrangements through which fluid can pass, the or each column arrangement being located in the ground and extending downwardly from the passage arrangement and in communication therewith, with at least part of the or each column arrangement having a fluid permeable exterior to receive gas from the area of ground.

whereby upon creating a flow of air through the passage arrangement and thereby creating a below ambient pressure in the passage arrangement, gas is drawn threinto from the column arrangement or arrangements.

5. A method of substantially preventing lateral gas migration from an area of ground, the method comprising:

installing a passage arrangement in the ground and extending generally horizontally to at least partially surround the area of ground, the passage arrangement having a substantially impermeable exterior, an inlet, and an outlet extending to atmosphere.

providing one or more column arrangements through which fluid can pass, the or each column arrangement being located in the ground and extending downwardly from the passage arrangement and in communication therewith, with at least part of the or each column arrangement having a fluid permeable exterior to receive gas from the area of ground, creating a flow of air through the passage arrangement and thereby creating a below ambient pressure in the passage arrangement so that gas is drawn thereinto from the column arrangement or arrangements.

6. Apparatus according to claim 1, in which the passage arrangement comprises a self supporting open structure.

7. Apparatus according to claim 1, in which the column arrangement comprises a self supporting open structure.

8. Apparatus according to claim 6, in which the open structure is formed of a plastics material.

9. Apparatus according to claim 8, in which the plastics material comprises polypropylene.

10. Apparatus according to claim 6, in which the open structure comprises a plurality of interconnectable modular units.

11. Apparatus according to claim 6, in which where the passage arrangement or column arrangement is impermeable, the open structure is provided within an impermeable coating layer.

12. Apparatus according to claim 6, in which where the passage arrangement or column arrangement is permeable, the open structure is provided within a part permeable coating layer to enable fluid to pass therethrough.

13. Apparatus according to claim 12, in which the coating layer has a relatively small pore size to act as a filter and substantially prevent solid material above a particular size passing therethrough.

14. Apparatus according to claim 13, in which the coating layer comprises a textile material.

15. Apparatus according to claim 14, in which the textile material is non-woven.

16. Apparatus according to claim 15, in which the textile material comprises a felt.

17. Apparatus according to claim 14, in which the textile material is made of plastics material.

18. Apparatus according to claim 17, in which the plastics material is made of polypropylene.

19. Apparatus according to claim 1, in which a plurality of column arrangements are provided extending from the passage arrangement at spaced intervals.

* * * * *